(12) United States Patent
Zhang et al.

(10) Patent No.: US 11,311,019 B1
(45) Date of Patent: Apr. 26, 2022

(54) FISHWAY EFFECT EVALUATION METHOD BASED ON STABLE ISOTOPE METHOD

(71) Applicant: Tianjin Research Institute for Water Transport Engineering, M.O.T., Tianjin (CN)

(72) Inventors: Huaqing Zhang, Tianjin (CN); Zhipeng Zhang, Tianjin (CN); Juntao Li, Tianjin (CN); Xiaoxiang Feng, Tianjin (CN); Mingqi Wang, Tianjin (CN); Feifei Qin, Tianjin (CN); Yanjie Wei, Tianjin (CN); Baishun Sun, Tianjin (CN); Haiying Liu, Tianjin (CN)

(73) Assignee: TIANJIN RESEARCH INSTITUTE FOR WATER TRANSPORT ENGINEERING, M.O.T., Tianjin (CN)

( * ) Notice: Subject to any disclaimer, the term of this patent is extended or adjusted under 35 U.S.C. 154(b) by 11 days.

(21) Appl. No.: 17/157,172

(22) Filed: Jan. 25, 2021

(30) Foreign Application Priority Data

Jan. 13, 2021 (CN) .......................... 202110039202.7

(51) Int. Cl.
*E02B 8/08* (2006.01)
*A22C 25/08* (2006.01)
*G01N 27/623* (2021.01)

(52) U.S. Cl.
CPC .............. *A22C 25/08* (2013.01); *E02B 8/085* (2013.01); *G01N 27/623* (2021.01)

(58) Field of Classification Search
CPC ........................................................ E02B 8/085
See application file for complete search history.

(56) References Cited

PUBLICATIONS

"Isotope niche dimension and trophic overlap between bigheaded carps and native filter-feeding fish in the lower Missouri River, USA", 9 pages, May 2018 (Year: 2018).*

* cited by examiner

*Primary Examiner* — Sunil Singh
(74) *Attorney, Agent, or Firm* — SZDC Law P.C.

(57) ABSTRACT

Disclosed in the present invention is a fishway effect evaluation method based on stable isotope method, belonging to the technical field of fishway effect evaluation. The fishway effect evaluation method according to the present invention comprises stable isotope ratio determination, trophic niche estimation and effectiveness evaluation on fishway construction. The evaluation method according to the present invention is used for researching one or more migratory fishes in the upstream and downstream of the water conservancy projects, determining and quantitatively explaining whether the influence of the water conservancy projects on one or more migratory fishes is eliminated or not from the perspective of the ecosystem through comparison and analysis of stable isotopes, and has the characteristics of high detection speed, stable result and the like.

4 Claims, 4 Drawing Sheets

FISHWAY EFFECT EVALUATION METHOD BASED ON STABLE ISOTOPE METHOD

CROSS-REFERENCE TO RELATED APPLICATIONS

The present disclosure claims the priority to the Chinese patent application with the filing number 202110039202.7, filed with the Chinese Patent Office on Jan. 13, 2021, and entitled "fishway effect evaluation method based on stable isotope method", which is incorporated herein by reference in its entirety.

TECHNICAL FIELD

The present invention belongs to the technical field of fishway effect evaluation, and in particular relates to a fishway effect evaluation method based on a stable isotope method.

BACKGROUND

As a fish passage facility, fishway is an ecological remedial measure for new water conservancy projects. The construction of water conservancy projects will artificially block the connectivity of river flows, affect the material circulations and energy flows of river ecosystems, destroy the integrity of ecosystems, and block the upstream passages of migratory fishes, thus affecting their spawning, feeding or overwintering. This will lead to the reduction of the population sizes of migratory fishes, and even the disappearance of species, which will not only affect the fishery resources, but also lead to decline in biodiversity. In order to reduce the adverse effects of water conservancy projects, fishway, as an ecological compensation measure to restore the connectivity of rivers, has been highly valued. Generally, artificial water tanks are built on sluices or dams for migratory fishes to go upstream, so that they can complete spawning, feeding, overwintering and other physiological activities.

However, most of the current assessment methods on the effectiveness of fishways focus on the number of fish species and the number of fish passed and the efficiency of fish passage (e.g. Key Designing Points and Effectiveness Assessment of Fish Passage Facilities, Hou Yiqun et al., Environmental Impact Assessment, No. 3, 2020; Study on the Efficiency and Influencing Factors of Xiniu Fishway in the Lianjiang River, Li Jie et al., Journal of Ecology and Rural Environment, No. 35 (12), 2019, pp. 1593-1600; Fish population structure in the fishway of Changzhou hydro-junction, Tan Xichang et al., Chinese Journal of Applied Ecology, May 2015, pp. 1548-1552). These assessment methods analyze and judge the effectiveness of fishways through simple statistics of the data from the fishways. Although these assessments may prove the effectiveness of fishways to a certain extent, they cannot directly explain whether fishways may eliminate or partially eliminate the blocking impacts of water conservancy projects. Have fishways achieved the passage fish? Have they solved the problem of fish migration in essence? Can we quantify the fish passage effect of fishways on one or several migratory fishes from the perspective of the ecosystem structure? These problems still need to be further explored and studied so as to assess and improve the designing and construction of fishways.

SUMMARY

Aiming at the defects in the prior art, the invention provides a fishway effect evaluation method based on a stable isotope method, which utilizes a stable isotope technology to research one or more migratory fishes in the upstream and the downstream of water conservation projects, determining and quantitatively explaining whether the influence of the water conservancy projects on one or more migratory fishes is eliminated or not through comparison and analysis of stable isotopes.

The technical solutions of the present invention are as below:

A fishway effect evaluation method based on a stable isotope method, comprising the following steps:

(i) Stable Isotope Ratio Determination sampling dominant migratory fishes in an upstream reservoir and a downstream river of a fishway construction project, determining $^{13}C$ ratio and $^{15}N$ ratio in fish bodies, namely $^{13}C/^{12}C$ and $^{15}N/^{14}N$, and comparing with standard objects to calculate a carbon stable isotope ratio $\delta^{13}C$ value and a nitrogen stable isotope ratio $\delta^{15}N$ value;

(ii) Trophic Niche Estimation using the determined $\delta^{13}C$ value and $\delta^{15}N$ as horizontal and vertical coordinates to establish a coordinate system;

drawing a two-dimensional scatter set formed by the $\delta^{13}C$ values and $\delta^{15}N$ values of fishes collected in an upstream reservoir into a coordinate system, and calculating a convex variable total area enclosed by solid connecting lines of the outermost edge of the scatters, wherein the area represents the trophic niche of the fish population in the upstream reservoir, which is represented by TAU; the $\delta^{13}C$ values and $\delta^{15}N$ values of the fishes collected from the downstream river are also drawn by the same method to form the trophic niche of the fish population in the downstream river, which is represented by TAD; and calculating the trophic niche overlap area in the fish population in the upstream reservoir and the downstream river, which is represented by OA;

(iii) Effectiveness Evaluation on Fishway Construction when the coincidence degree of TAU and TAD exceeds 60% of TAD, namely when OA≥60% TAD, this indicates that a very significant number of fishes successfully migrate from a downstream river to an upstream reservoir via a fishway, the construction effect of the fishway is considered to be excellent, and the influence of water conservancy projects on migration of the fishes is basically eliminated;

when the coincidence degree of TAU and TAD is 30-60% of TAD, namely when 60% TAD>OA≥30% TAD, this indicates that a significant number of the fishes successfully migrate from a downstream river to an upstream reservoir via a fishway, the construction effect of the fishway is considered to be good, and the influence of water conservation projects on the migration of the fishes is mostly eliminated;

when the coincidence degree of TAU and TAD is 10-30% of TAD, namely 30% TAD>OA≥10% TAD, this indicates that a certain amount of fishes successfully migrate to an upstream reservoir from a downstream river through a fishway, the construction effect of the fishway is qualified, and the influence of water conservancy projects on the migration of the fishes is eliminated to a certain extent; and when the coincidence degree between TAU and TAD does not reach 10% of TAD, namely 10% TAD>OA, this indicates that a small number of the fishes successfully migrate from the downstream river to the upstream reservoir through the fishway, the construction effect of the fishway is determined not to reach the qualified level, and the influence of water conservancy projects on the migration of the fishes is basically not eliminated.

The effective evaluation index 60%, 30% and 10% for fishway construction are set according to the property of the stable isotope, a same population, after multiple sampling, the overlapping degree may basically reach 60% above.

In the described technical solution, according to the area of the reservoir and the river, there are no less than three sampling sites in each sampling area when performing sampling in the step (i); and the sampling time is selected according to migration physiological requirements of the dominant migratory fishes.

In the described technical solution, the determination of $^{13}C$ ratio and $^{15}N$ ratio comprises: accurately weighting and taking quantitative samples to be tested, packaging the samples using 4×6 tin can, and using elementary analyzer-stable isotope mass spectrograph to perform on line determination to the $^{13}C/^{12}C$ and $^{15}N/^{14}N$ in the samples to be tested in the fishes.

In the described technical solution, the calculation method for the stable isotope ratio in step (i) is as below:

comparing the determined $^{13}C/^{12}C$ and $^{15}N/^{14}N$ with standard objects to calculate carbon stable isotope ratio ($\delta^{13}C$) and nitrogen stable isotope ratio ($\delta^{15}N$);

the carbon stable isotope ratio being represented as $\delta^{13}C$, and the calculation formula being as below:

$$\delta^{13}C(‰) = \left(\frac{^{13}C/^{12}C_{sample}}{^{13}C/^{12}C_{VPDB}} - 1\right) \times 1000; \quad (1)$$

in formula (1), $^{13}C/^{12}C_{sample}$ denoting the actual carbon isotope ratio, $^{13}C/^{12}C_{VPDB}$ denoting the carbon isotope ratio of the international standard object VPDB; and the error rate of $\delta^{13}C‰$ being less than 0.2‰;

the nitrogen stable isotope ratio being represented as $\delta^{15}N$, and the calculation formula being as below:

$$\delta^{15}N(‰) = \left(\frac{^{15}N/^{14}N_{sample}}{^{15}N/^{14}N_{air}} - 1\right) \times 1000; \quad (2)$$

in formula (2), $^{15}N/^{14}N_{sample}$ denoting the actual nitrogen isotope ratio, $^{15}N/^{14}N_{air}$ denoting the nitrogen isotope ratio of the standard atmosphere; and the error rate of $\delta^{15}N$ being less than 0.3‰; and using SPSS16.0 one-way ANOVA to verify whether the screened out $\delta^{13}C$ value and $\delta^{15}N$ value in the fish samples have significant difference and to remove the data having significant difference.

In the described technical solution, the number of samples for fish sampling is at least 30. In ecology, 30 tails of fish may represent this fish population.

In the technical solution of the present invention, TAU represents the trophic niche of the fish population in the upstream reservoir population, TAD represents the trophic niche of the fish population in the downstream river population, and OA represents the coincidence degree of TAU and TAD.

The invention has the following beneficial effects:

The present invention provides a method for fishway construction effect evaluation from the perspective of the ecosystem structure on the basis of the stable isotope technology. The evaluation method according to the present invention is used for researching one or some migratory fishes in the upstream and downstream of the water conservancy projects, determining and quantitatively explaining whether the influence of the water conservancy projects on one or more migratory fishes is eliminated or not from the perspective of the ecosystem through comparison and analysis of stable isotopes, and has the characteristics of high detection speed, stable result and the like.

The stable isotope technology is a method having multiple functions such as tracing, integration and instruction, the determination result often shows a series of raw data set representing material information, the method can be used to project the raw data set into the coordinate system so as to form intuitive description of trophic niche information of the researched fishes, and a comparison between the trophic niche information of a fish in an upstream reservoir and in a downstream river of the water conservation projects at specific period can be made to determine whether they are considered as a same fish population, thereby evaluating the fishway construction effect.

DETAILED DESCRIPTION OF THE EMBODIMENTS

Figure 1:
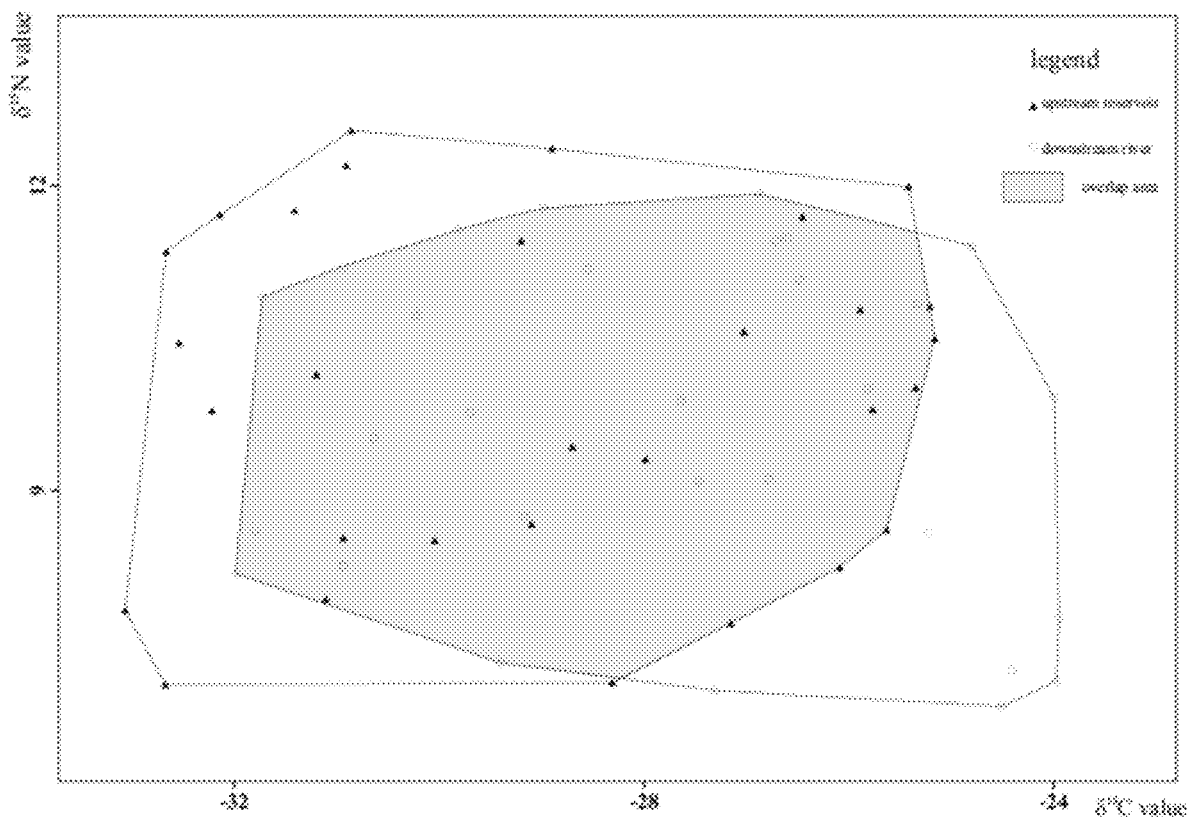
FIG. 1 is a trophic niche diagram of *Hypophthalmichthys molitrix* in the upstream and downstream of a certain fishway A in Xiang River.

The terms used in the present invention have generally the meanings that are commonly understood by those of ordinary skill in the art, unless otherwise specified.

The present invention is described in further detail below with reference to specific examples and data. The following examples are intended to illustrate the invention, but not to limit the scope of the invention in any way.

Example 1

Fishway Effect Evaluation Method Based on Stable Isotope Method

The method comprises the following steps:

(i) Selecting the Sampling Area taking the upstream reservoir and the downstream river of the fishway construction project as the sampling area, there are at least three sampling sites in each sampling area when performing sampling according to the areas of the reservoir and the river;

(ii) Selecting the Sampling Species according to the historical data and the local research result of the fishway watershed, selecting typical domain migratory fishes in the sampling area for sampling and research work;

(iii) Selecting the Sampling Time selecting the sampling time according to the migratory psychological needs of the fishes, for example, spawning migratory fishes selecting the spawning seasons for sampling, feeding migratory fishes selecting the time when they need to forage a lot for sampling, and overwintering migratory fishes selecting the season when they migrate to proper temperature for sampling;

(iv) Sampling and Screening selecting sampling tools according to different living environments of fishes, wherein the fishes at the middle and upper layers can be collected using a drift net, the fishes at the lower layer can be sampled using a bottom trawl net or a ground cage net, and 30 tails of the samples with quick action, high body color and luster and complete fin stretching and unfolding are randomly selected from the collected samples and are frozen and stored at −20° C.;

(v) Sample Treatment removing fish skin, taking back muscle, drying in an oven at 60° C. for 48 h until reaching a constant weight, taking out, grinding into fine powder, and storing in a drier to obtain a fish sample to be tested.

(vi) Stable Isotope Ratio Determination accurately weighting and taking quantitative samples to be tested, packaging the samples using 4×6 tin can, and using elementary analyzer-stable isotope mass spectrograph (Flash EA 1112 HT-Delta V Advantages, Thermo Company) to perform on line determination to the $^{13}C$ ratio ($^{13}C/^{12}C$) and the $^{15}N$ ratio ($^{15}N/^{14}N$) in the samples to be tested in the fishes, calculating the stable isotope ratio ($\delta^{13}C$) and the nitrogen stable isotope ratio ($\delta^{15}N$) according to the formula.

the carbon stable isotope ratio being represented as $\delta^{13}C$, and the calculation formula being as below:

$$\delta^{13}C(‰) = \left(\frac{^{13}C/^{12}C_{sample}}{^{13}C/^{12}C_{VPDB}} - 1\right) \times 1000; \quad (1)$$

in formula (1), $^{13}C/^{12}C_{sample}$ denoting the actual carbon isotope ratio, $^{13}C/^{12}C_{VPDB}$ denoting the carbon isotope ratio of the international standard object VPDB; and the error rate of $\delta^{13}C‰$ being less than 0.2‰;

the nitrogen stable isotope ratio being represented as $\delta^{15}N$, and the calculation formula being as below:

$$\delta^{15}N(‰) = \left(\frac{^{15}N/^{14}N_{sample}}{^{15}N/^{14}N_{air}} - 1\right) \times 1000; \quad (2)$$

in formula (2), $^{15}N/^{14}N_{sample}$ denoting the actual nitrogen isotope ratio, $^{15}N/^{14}N_{air}$ denoting the nitrogen isotope ratio of the standard atmosphere; and the error rate of $\delta^{15}N$ being less than 0.3‰;

using SPSS16.0 one-way ANOVA to verify whether the screened out $\delta^{13}C$ value and $\delta^{15}N$ value in the fish samples have significant difference and to remove the data having significant difference.

(vii) Trophic Niche Estimation using the determined $\delta^{13}C$ value and $\delta^{15}N$ as horizontal and vertical coordinates to establish a coordinate system; in the coordinate system, $\delta^{13}C$ Value Variational Range (CR) represents the feeding range of this fish, $\delta^{15}N$ Value Variational Range (NR) represents the trophic level range of this fish;

drawing a two-dimensional scatter set formed by $\delta^{13}C$ value and $\delta^{15}N$ value of fishes collected by an upstream reservoir into a coordinate system, and calculating a Total Area (TA) of convex deformation surrounded by solid connecting lines of scatters on the outermost edge, wherein the area represents the trophic niche of the fish population in the upstream reservoir, which is represented by TAU; drawing the $\delta^{13}C$ value and $\delta^{15}N$ value of the fish collected from the downstream river by the same method to form the trophic niche of the fish population in the downstream river, which is expressed by TAD; and calculating the trophic niche Overlap Area, which is represented by OA, of the fish population in the upstream of the reservoir and the downstream of the river; using ArcMap 10.1 to calculate OA, generating an area map according to all the introduced coordinate point data, and calculating the numerical value of the area, generating an overlap area and calculating the numerical value of the area by cross function.

(viii) Effectiveness Evaluation on Fishway Construction when the coincidence degree of TAU and TAD exceeds 60% of TAD, namely when OA≥60% TAD, this indicates that a very significant number of fishes successfully migrate from a downstream river to an upstream reservoir via a fishway, the construction effect of the fishway is considered to be excellent, and the influence of water conservancy projects on migration of the fishes is basically eliminated;

when the coincidence degree of TAU and TAD is 30-60% of TAD, namely when 60% TAD>OA≥30% TAD, this indicates that a significant number of the fishes successfully migrate from a downstream river to an upstream reservoir via a fishway, the construction effect of the fishway is considered to be good, and the influence of water conservation projects on the migration of the fishes is mostly eliminated;

when the coincidence degree of TAU and TAD is 10-30% of TAD, namely 30% TAD>OA≥10% TAD, this indicates that a certain amount of fishes successfully migrate to an upstream reservoir from a downstream river through a fishway, the construction effect of the fishway is qualified, and the influence of water conservancy projects on the migration of the fishes is eliminated to a certain extent; and when the coincidence degree between TAU and TAD does not reach 10% of TAD, namely 10% TAD>OA, this indicates that a small number of the fishes successfully migrate from the downstream river to the upstream reservoir through the fishway, the construction effect of the fishway is determined not to reach the qualified level, and the influence of water conservancy projects on the migration of the fishes is basically not eliminated.

The on-site fishway effect is evaluated according to the described evaluation method.

Example 2

Sampling area: a certain fishway A in Xiang River;
Sampling species: *Hypophthalmichthys molitrix*;
Sampling number: 60 tails;
Sampling site number: 3 sampling sites in the upstream and downstream, respectively;
Sampling time property: spawning migration;
Evaluation method: evaluating according to example 1.

The evaluation result is shown in FIG. 1, and the result shows: the TAU of *H. molitrix* is 35.8, and the TAD is 33.4. The OA is 25.4, equaling to 76.0% TAD, and being greater than 60% TAD. Hence, the construction of the fishway A is considered to have an excellent effect on *H. molitrix* migration.

Example 3

Figure 2:
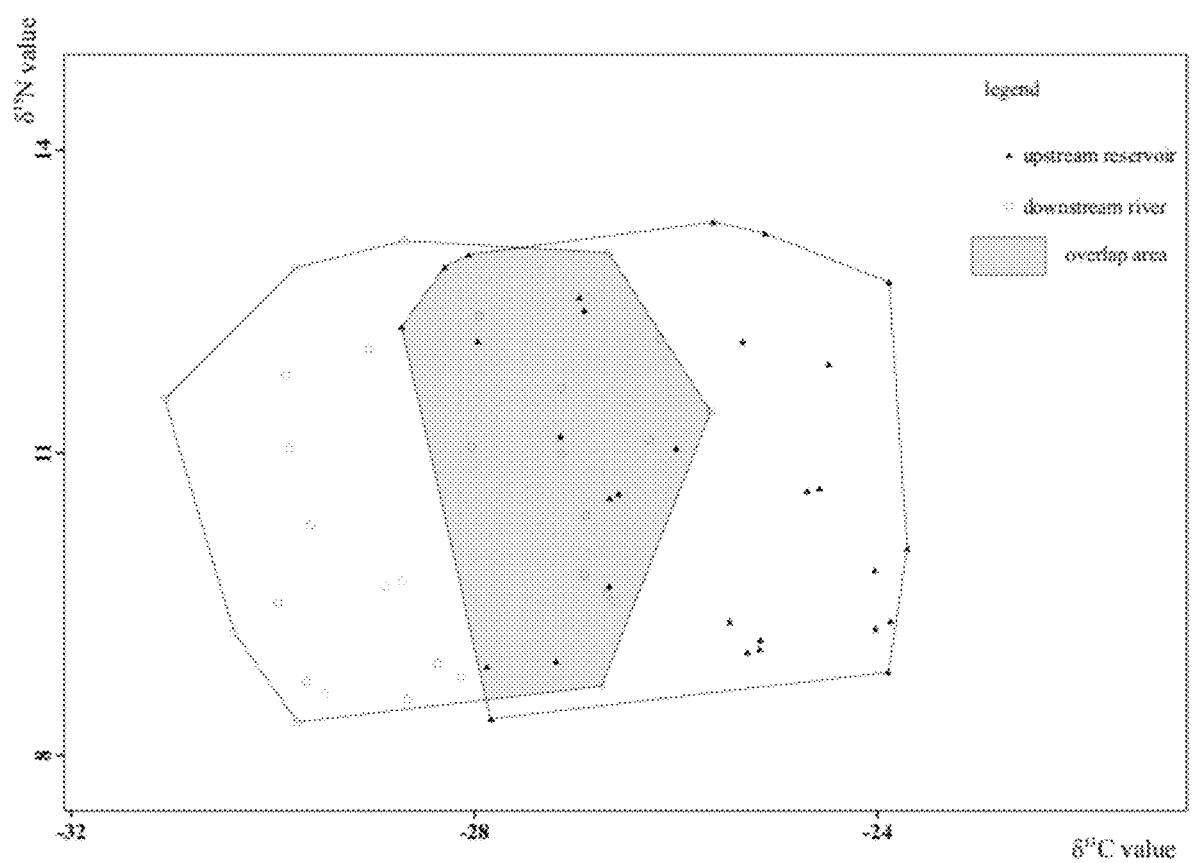
FIG. 2 is a trophic niche diagram of *Mylopharyngodon piceus* in the upstream and downstream of a certain fishway B in Han River.

Sampling area: a certain fishway B in Han River;
Sampling species: *Mylopharyngodon piceus*;
Sampling number: 60 tails;

Sampling site number: 3 sampling sites in the upstream and downstream, respectively;
Sampling time property: spawning migration;
Evaluation method: evaluating according to example 1.
The evaluation result is shown in FIG. 2, and the result shows: the TAU of *M piceus* is 20.3, and TAD is 19.4. The OA is 9.4, equaling to 48.5% TAD, and being between 30%-60% TAD. Hence, the construction of the fishway B is considered to have a good effect on *M. piceus* migration.

Example 4

Figure 3:
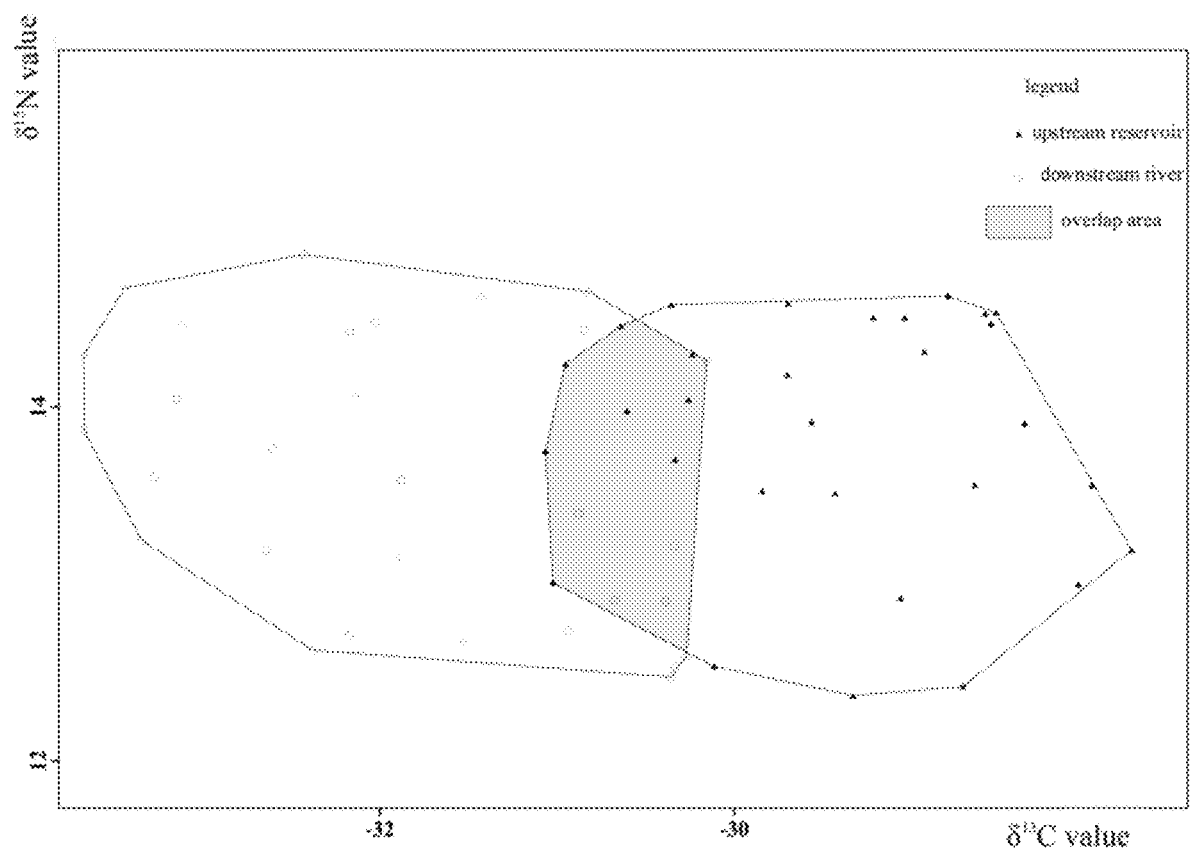
FIG. 3 is a trophic niche diagram of *Aristichthys nobilis* in the upstream and downstream of a certain fishway C in Xiang River.

Sampling area: a certain fishway C in Xiang River;
Sampling species: *Aristichthys nobilis*;
Sampling number: 60 tails;
Sampling site number: 3 sampling sites in the upstream and downstream, respectively;
Sampling time property: spawning migration;
Evaluation method: evaluating according to example 1.
The evaluation result is shown in FIG. 3, and the result shows: the TAU of *A. nobilis* is 5.7, and TAD is 6.7. The OA is 1.3, equaling to 19.4% TAD, and being between 10%-30% TAD. Hence, the construction of the fishway C is considered to have a qualified effect on *A. nobilis* migration.

Example 5

Figure 4:
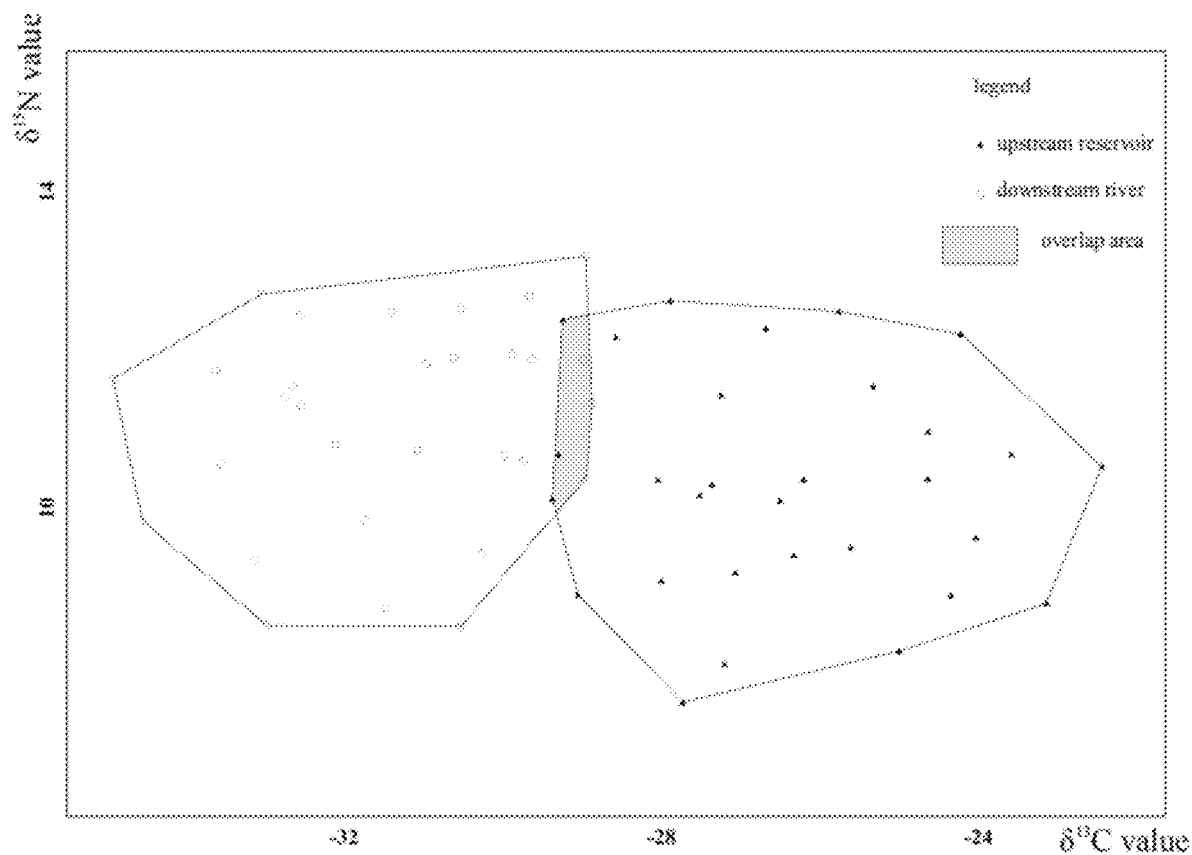
FIG. 4 is a trophic niche diagram of *Hypophthalmichthys molitrix* in the upstream and downstream of a certain fishway D in Dadu River.

Sampling area: a certain fishway D in Dadu River;
Sampling species: *H. molitrix*;
Sampling number: 60 tails;
Sampling site number: 3 sampling sites in the upstream and downstream, respectively;
Sampling time property: spawning migration;
Evaluation method: evaluating according to example 1.
The evaluation result is shown as FIG. 4, and the result shows: the TAU of *H. molitrix* is 26.4, and the TAD is 21.8. The OA is 0.9, equaling to 4.1% TAD, and being less than 10% TAD. Hence, the construction of the fishway D is considered not to have a qualified effect on *H. molitrix* migration.

To sum up, while the invention has been described with reference to a preferred embodiment, it will be understood by those skilled in the art that various changes may be made and equivalents may be substituted for elements thereof without departing from the scope of the invention. However, any simple modification, equivalent change and modification of the above embodiments according to the technical essence of the present invention will still fall within the protection scope of the technical solution of the present invention.

What is claimed is:

1. A method for evaluating a fishway effect based on stable isotope ratio, consisting of the following steps:
(i) determining stable isotope ratio:
sampling a dominant migratory fish in an upstream reservoir and in a downstream river of a fishway construction project, determining a $^{13}C/^{12}C$ ratio of the dominant migratory fish in the upstream reservoir and a $^{13}C/^{12}C$ ratio of the dominant migratory fish in the downstream river and a $^{15}N/^{14}N$ ratio of the dominant migratory fish in the upstream reservoir and a $^{15}N/^{14}N$ ratio of the dominant migratory fish in the downstream river, comparing the $^{13}C/^{12}C$ ratio in the upstream reservoir, the $^{13}C/^{12}C$ ratio in the downstream river, the $^{15}N/^{14}N$ ratio in the upstream reservoir, and the $^{15}N/^{14}N$ ratio in the downstream river with a predetermined $^{13}C/^{12}C$ ratio of a common and stable object in the upstream reservoir, a predetermined $^{13}C/^{12}C$ of a common and stable object in the downstream river, a predetermined $^{15}N/^{14}N$ ratio of the common and stable object in the upstream reservoir, and a predetermined $^{15}N/^{14}N$ ratio of the common and stable object in the downstream river, and calculating a carbon stable isotope ratio $\delta^{13}C$ value in the upstream reservoir, a carbon stable isotope ratio $\delta^{13}C$ value in the downstream river, a nitrogen stable isotope ratio $\delta^{15}N$ value in the upstream reservoir, and a nitrogen stable isotope ratio $\delta^{15}N$ value in the downstream river;

(ii) estimating trophic niche:
calculating an area TAU that represents a trophic niche of a population of the dominant migratory fish in the upstream reservoir using the carbon stable isotope ratio $\delta^{13}C$ value in the upstream reservoir and the nitrogen stable isotope ratio $\delta^{15}N$ value in the upstream reservoir;
calculating an area TAD that represents a trophic niche of a population of the dominant migratory fish in the downstream river using the carbon stable isotope ratio $\delta^{13}C$ value in the downstream river and the nitrogen stable isotope ratio $\delta^{15}N$ value in the downstream river;
calculating an area OA that represents a trophic niche of an overlap population of the dominant migratory fish in the upstream and in the downstream river using the area TAU and the area TAD;

(iii) evaluating the effectiveness of the fishway construction project:
when the area OA is equal or greater than 60% of the area TAD, the fishway construction project is considered to be successful;
when the area OA is less than 60% of the area TAD and equal or greater than 30% of the area TAD, the fishway construction project is considered to be effective;
when the area OA is less than 30% of the area TAD and equal or greater than 10% of the area TAD, the fishway construction project is considered to be satisfactory; and
when the area OA is less than 10% of the area TAD, the fishway construction project is considered to be failed,
wherein sampling the dominant migratory fish includes obtaining at least 30 dominant migratory fish as samples, and does not include sampling any other fish.

2. The method according to claim 1, wherein in step (i), sampling the dominant migratory fish in the upstream reservoir and in the downstream river includes performing sampling at least three sample sites in the upstream reservoir and at least three sample sites in the downstream river and performing sample at a time according to a migration physiological pattern of the dominant migratory fish.

3. The method according to claim 1, wherein determining the $^{13}C/^{12}C$ ratio and the $^{15}N/^{14}N$ ratio includes: accurately weighting and taking quantitative samples of the dominant migratory fish to be tested, packaging the samples using a tin can, and using elementary analyzer-stable isotope mass spectrograph to perform on line determination of the $^{13}C/^{12}C$ ratio and the $^{15}N/^{14}N$ ratio.

4. The method according to claim 1, wherein calculating the carbon stable isotope ratio $\delta^{13}C$ value and the nitrogen stable isotope ratio $\delta^{15}N$ value includes:
calculating the carbon stable isotope ratio $\delta^{13}C$ value using formula (1):

$$\delta^{13}C(\permil) = \left(\frac{^{13}C/^{12}C_{sample}}{^{13}C/^{12}C_{VPDB}} - 1\right) \times 1000, \quad (1)$$

wherein $^{13}C/^{12}C_{sample}$ is the $^{13}C/^{12}C$ ratio in the upstream reservoir and the $^{13}C/^{12}C$ ratio in the downstream river, $^{13}C/^{12}C_{VPDB}$ is a carbon isotope ratio of an international standard object VPDB, and an error rate of $\delta^{13}C‰$ is less than 0.2‰;

calculating the nitrogen stable isotope ratio $\delta^{15}N$ value using formula (2):

$$\delta^{15}N(‰) = \left(\frac{^{15}N/^{14}N_{sample}}{^{15}N/^{14}N_{air}} - 1\right) \times 1000, \quad (2)$$

wherein $^{15}N/^{14}N_{sample}$ is the $^{15}N/^{14}N$ ratio in the upstream reservoir and the $^{15}N/^{14}N$ ratio in the downstream river, $^{15}N/^{14}N_{air}$ is a nitrogen isotope ratio in a standard atmosphere, and an error rate of $\delta^{15}N$ is less than 0.3‰; and using an SPSS16.0 one-way ANOVA method to identify and remove the carbon stable isotope ratio $\delta^{13}C$ value and the nitrogen stable isotope ratio $\delta^{15}N$ value that have significant difference.

* * * * *